United States Patent
Nordstrom

(10) Patent No.: US 8,512,517 B2
(45) Date of Patent: Aug. 20, 2013

(54) PROCESS FOR THE PRODUCTION OF PAPER OR PAPERBOARD

(75) Inventor: Jan-Erik Nordstrom, Nacka (SE)

(73) Assignee: Stora Enso AB, Falun (SE)

( * ) Notice: Subject to any disclaimer, the term of this patent is extended or adjusted under 35 U.S.C. 154(b) by 0 days.

(21) Appl. No.: 13/144,025

(22) PCT Filed: Jan. 29, 2010

(86) PCT No.: PCT/SE2010/050096
§ 371 (c)(1),
(2), (4) Date: Jul. 11, 2011

(87) PCT Pub. No.: WO2010/093311
PCT Pub. Date: Aug. 19, 2010

(65) Prior Publication Data
US 2011/0297342 A1    Dec. 8, 2011

(30) Foreign Application Priority Data
Feb. 16, 2009    (SE) .................................... 0900191

(51) Int. Cl.
*D21F 11/04*    (2006.01)
*D21F 1/02*    (2006.01)

(52) U.S. Cl.
USPC ..................... 162/124; 162/135; 162/181.1

(58) Field of Classification Search
USPC ............... 162/123–133, 135, 181.1–181.7; 427/358, 361, 391
See application file for complete search history.

(56) References Cited

U.S. PATENT DOCUMENTS

| | | | | |
|---|---|---|---|---|
| 2,286,924 | A * | 6/1942 | Nicholson | 162/124 |
| 3,598,696 | A * | 8/1971 | Beck | 162/298 |
| 4,008,121 | A * | 2/1977 | Coleman | 162/124 |
| 4,376,014 | A | 3/1983 | Bergstrom | |
| 4,384,922 | A * | 5/1983 | Stotz | 162/259 |
| 6,270,624 | B1 | 8/2001 | Huovila et al. | |
| 6,423,181 | B1 | 7/2002 | Mendez-Gallon et al. | |
| 6,627,042 | B2 * | 9/2003 | Holik | 162/123 |
| 2004/0244927 | A1 * | 12/2004 | Pianta et al. | 162/124 |
| 2011/0297342 | A1 * | 12/2011 | Nordstrom | 162/124 |

FOREIGN PATENT DOCUMENTS

| | | |
|---|---|---|
| DE | 19857096 | 7/1999 |
| EP | 1318230 | 6/2003 |
| GB | 2109302 | 6/1983 |
| WO | WO 9936618 A1 * | 7/1999 |
| WO | WO 2010093311 A1 * | 8/2010 |

* cited by examiner

Primary Examiner — Jose A Fortuna
(74) Attorney, Agent, or Firm — Greer, Burns & Crain, Ltd.

(57) ABSTRACT

The present invention relates to a process for producing a paper or paperboard product which process comprises the steps of providing a first headbox with a furnish comprising fibers, which furnish forms at least one layer of the paper or paperboard product, providing the headbox with a non-fibrous high consistency composition, which composition forms at least one additional layer of the paper or paperboard product and conducting the layers onto a wire forming a multilayer web which is further dewatered and dried forming the paper or paperboard product. The invention further relates to a paper or paperboard produced according to the process and a headbox used in the process.

12 Claims, 1 Drawing Sheet

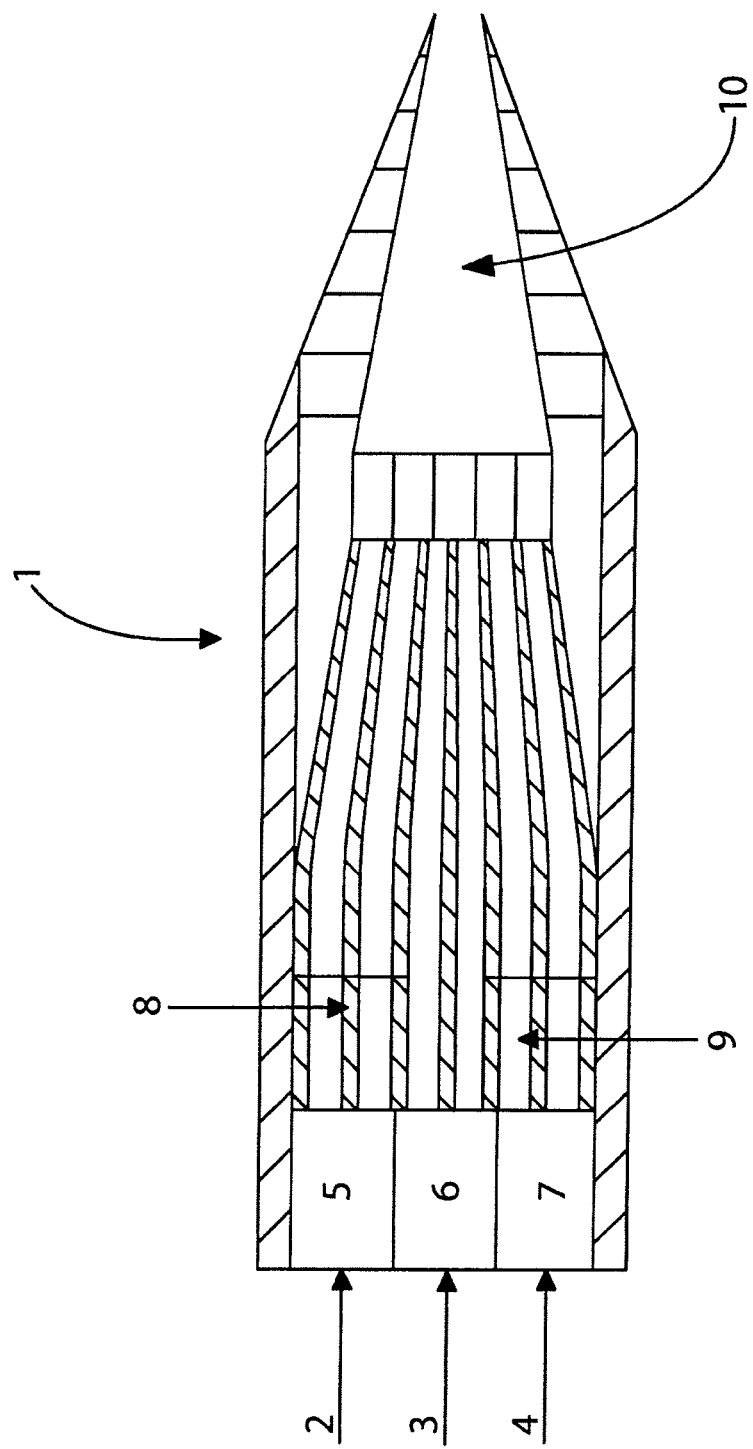

PROCESS FOR THE PRODUCTION OF PAPER OR PAPERBOARD

FIELD OF THE INVENTION

The present invention relates to a process for producing a multilayer paper or paperboard product comprising a non-fibrous high consistency layer.

The invention further relates to a paper or paperboard produced according to the process and a headbox used in the process.

BACKGROUND

Production of multilayer papers can either be done by the use of a head-box in a single step or by the use of several headboxes and wires or forming units. The challenge is to produce smooth fibre layers without streaks or fibre flocks, i.e. layers with good formation.

The consistency of a furnish in the headbox is of great importance for obtaining a fibre web with good formation. Higher consistency makes it much more difficult to produce a smooth fibre web since the fibres tend to flock, which can be seen as a cloudy visual appearance in the fibre web sheet, i.e. the formation is not good. The normal consistency of a furnish in a headbox is about 0.5-2%, but some examples of higher consistency has also been described in prior art. One example can be seen in U.S. Pat. No. 4,376,012 which discloses usage of a consistency of about 2-5%.

In papermaking processes there is an ongoing concern to find ways to produce paper or paperboard at reduced costs. One way is to reduce the energy needed for the produced paper or paperboard. Many steps in a production line demands high amounts of energy and reducing the energy demand also decreases the production cost. By increasing the consistency, i.e. by reducing the water content, the dewatering and drying demand is reduced, and thus also the energy needed.

Another way to decrease the production cost is to decrease the amount of the expensive raw material, i.e. fibres in the product. In papermaking, fillers are often added in order to improve the properties of the paper but also to reduce the raw material content and thus also the total cost. When making paperboard, there is an ongoing development to produce a paperboard with high bulk and thus decreased raw material content but without decreasing the strength and thickness of the paperboard to maintain the stiffness in the produced paperboard.

There is, however, a need for an improved process to make a paper or paperboard product which decreases the production cost by reducing both the energy demand and the raw material content.

SUMMARY OF THE INVENTION

It is an object of the present invention to provide a process for production of a paper or paperboard product in an energy efficient way.

Another object of the invention is to produce a paper or paperboard at a decreased cost.

By adding a non-fibrous high consistency composition in the headbox during production of a paper or paperboard product, it is possible to decrease the drying demand of the produced product as well as affect the raw material content and thus also the production cost. This is achieved by the independent claims. Preferred embodiments of the process are defined in the dependent claims.

The invention relates to a process for producing a multilayer paper or paperboard product, which process comprises the steps of providing a first headbox with a furnish comprising fibres, which furnish forms at least one layer of the paper or paperboard product, providing the headbox with a non-fibrous high consistency composition, which composition forms at least one additional layer of the paper or paperboard product and conducting the layers onto a wire forming a multilayer web which is further dewatered and dried forming the paper or paperboard product.

The non-fibrous high consistency composition may have a dry content of 5-70% by weight, preferably 10-40% by weight. The high dry content of this layer increases the total dry content of the multilayer web which reduces the need for dewatering in the forming and in the press sections and gives easier and faster drying.

The content of the non-fibrous high consistency composition may be increased and the content may be 10-80% by weight of the total content of the paper or paperboard product. In this way the drying efficiency increases and the cost decreases.

The non-fibrous high consistency composition may be a coating colour. In this way it is possible to add a coating composition already in the headbox which both increases the dry content of the formed fibre web and also improves the opacity and printability of the formed paper or paperboard product.

The multilayer web preferably has a dry content above 1.5% by weight when conducted onto the wire before dewatering, i.e. on the forming section. This is higher compared to fibre webs described in prior art, which means that the drying demands of the fibre web according to the invention is decreased.

The paper or paperboard product preferably consists of at least three layers and it is most preferred that a non-fibrous high consistency layer forms the middle layer of the paper or paperboard product. Even more preferable, the outer layers are fibre layers and the middle layer is a non-fibrous high consistency layer, preferable a coating layer. In this way, the formed paper or paperboard product will have improved or remained quality at decreased raw material content and/or cost.

The process may also provide a second headbox with a furnish comprising fibres forming at least one additional layer of the paper or paperboard product and providing the second headbox with a non-fibrous high consistency composition forming at least one additional layer of the paper or paperboard product and conducting the layers onto at least one wire forming a multilayer web which is further dewatered and dried to form the paper or paperboard product. It is common, when making for example multilayer paperboard products, to use more than one headbox.

The invention further relates to a paper or paperboard product produced according to the process mentioned above.

The invention also relates to a headbox for use in the process mentioned above wherein the headbox comprises at least a first and a second inlet channel, at least one turbulence generator and a sliced cone, wherein the first inlet channel and the at least one turbulence generator are adapted to receive a furnish comprising fibres and wherein the first inlet channel and the turbulence generator are arranged so that the furnish is passed through the first inlet channel and further to the turbulence generator and thereafter to the sliced cone, and wherein the second inlet channel is adapted to receive a non-fibrous high consistency composition and wherein the second inlet channel is arranged so that the non-fibrous high consistency composition is passed through the second inlet channel and directly to the sliced cone.

The headbox preferably comprises three inlet channels wherein two is adapted to receive furnish and one is adapted to receive a non-fibrous high consistency composition. In this way a three layer paper or paperboard product is produced wherein one layer of the product is a non-fibrous high consistency layer and two layers are fibre layers.

It is preferred that the inlet channels adapted to receive furnish conducts the furnish to at least one turbulence generator and the inlet channel which is adapted to receive the non-fibrous high consistency composition conducts the non-fibrous high consistency composition directly to a sliced cone. In order to get a good formation on a fibre layer it is necessary to have a turbulence generator which prevents the fibres from flocking. The high consistency layer does not contain fibres and it may thus not be necessary to have a turbulence generator in order to get a homogen layer. The headbox can thus be made smaller due to the lack of turbulence generator for the high consistency layer. Thus, the non-fibrous high consistency composition may be conducted from the inlet channel directly to the sliced cone without passing a turbulence generator.

BRIEF DESCRIPTION OF THE DRAWINGS

The present invention will by way of example be described in more detail with reference to the appended schematic drawing, which shows an embodiment of the present invention.

FIG. 1 shows a headbox according to the invention.

DETAILED DESCRIPTION

The invention describes a totally new process which results in a new type of paper or paperboard product. The process reduces both the energy demands and the raw material content, i.e. fibre demand of the produced product. The invention also gives an existing paper or paperboard machine the potential to increase production capacity, i.e. no major modifications of the paper or paperboard machine is necessary in order produce this high quality product.

The non-fibrous high consistency composition preferably has a dry content of about 5-70% by weight, preferably 10-40% by weight or even more preferably 25-40% by weight. Higher dry content decreases the amount of water which needs to be removed from the formed paper or paperboard product. The optimal dry content depends on the construction of the forming section, on the properties of the composition and on the capacities of the pumps which conducts the composition to the headbox and further on to the wire/wires. Due to high consistency of the non-fibrous high consistency composition, the resulting multilayer product will have a higher consistency during production compared to multilayer fibre products produced according to prior art.

The non-fibrous high consistency composition does preferably not contain any fibres. However, small amounts of fibres or fines from fibres may be present. The composition contains drained water from the forming process which may partially or completely be recycled and then fractions of fibres or fines from fibres might also be present. However, the major part of the composition, i.e. more than 90% by weight and preferably more than 97% by weight is non-fibrous material.

Furthermore, by adding a non-fibrous high consistency composition already in the headbox it is possible to increase the total content of the non-fibrous composition in the paper or paperboard and thus also to decrease the fibre content. The non-fibrous high consistency composition content may be 10-80%, preferably 30-60% by weight of the total content of the paper or paperboard produced. In this way the drying demands decreases since it takes more energy to dry fibres compared to, for example fillers or coating colour, which are two examples of non-fibrous high consistency composition. Furthermore, the cost decreases both since the drying demand decreases and since most non-fibrous high consistency compositions are much cheaper compared to fibres.

According to the invention the water content in the headbox is minimized. The at least one layer with fibres has a consistency of 0.1-5% by weight, preferable between 0.2-2% by weight or even more preferably 1-1.4% by weight. The consistency of the fibres is chosen in a way so that the best formation of the fibre layer is achieved. Conventionally used dilution techniques may be used to better control the cross direction profiles in any, or all, of the layers to be formed.

The non-fibrous high consistency composition is preferably a coating colour. The invention thus combines the forming area with the coating area by putting the coating layer into the head-box of a paper or paperboard machine.

The coating layer increases the quality of the paper or paperboard product, such as the printability and the opacity. It is also possible to produce a smooth coating layer from a high consistency coating colour at high speed.

The coating colour may be a composition with a certain predetermined recipe comprising inorganic or organic pigments, binder and if necessary additional additives. Common pigments which can be used are clay (kaolin), calcium carbonate, titan dioxide, talc, calcium sulphate (gypsum) and granules of starch or other organic pigments. The binder is added in order to bind the pigments together and can for example be starch, carboxymethylcellulose (CMC) or a synthetic binder such as latex e.g. styrene-butadien latex or acrylic-copolymer latex. Other additives can for example be wet strength agents, surfactants or dispersion agents. The pigments, binder and other additives are chosen based on the desired properties of the produced paper or paperboard product. The coating colour may also contain small amounts of fibres or fines from fibres, which mainly come from the drained recirculated water during the forming or pressing, e.g. from the short or long circulation in a paper or paperboard machine.

The paper or paperboard product according to the invention can have the coating layer as a surface layer and the coating layer can thus be printed in a conventional way. The coating layer can also be surrounded by at least two fibre layers, i.e. at least one fibre layer on each side of the coating layer. The printability of the paper or paperboard product is still improved due to the presence of the coating layer in-between the fibre layers, for example problems with print bleeding or showing through the paper or paperboard product are decreased.

Furthermore, the opacity of the paper or paperboard product is improved, i.e. increased, since the coating colour consists of pigments which diffract the light more efficiently than fibres and thus prevent seeing through the paper or paperboard product.

The non-fibrous high consistency composition may also be a homogen polymer solution which can form a barrier in order to create an impermeable layer against liquids, gases etc in or on the formed paper or paperboard product.

The produced paper or paperboard product also has a decreased raw material demand. Normally, fillers are added to the furnish which makes it possible to decrease the amount of raw material. However, fillers are mixed together with fibres and it is not possible to increase the dry content of a fibre/filler mixture in the headbox since it then will not be possible to produce a smooth paper or paperboard product. This is due to the fact that high solid contents of fibres tend to flocculate and thus give an uneven sheet structure. The produced paper or paperboard according to this invention has both decreased dewatering demands as well as decreased raw material content and the non-fibrous content of the paper or paperboard is thus increased. The non-fibrous content of the produced paper or paperboard product can, as previously mentioned, be increased and preferred values are approximately 35% by weight or more, preferably 50% by weight or more of the total content of the product.

The paper or paperboard produced according to the invention will be of a completely new type with high amount of non-fibrous high consistency composition, for example coating colour, within the product and thus the product will have remained or better properties, even at lower grammages.

The produced paper or paperboard product will also have other improved properties as various layers can be added within the sheet to enhance different properties. In this way it is possible to produce a paper or paperboard product with totally new properties. Examples of non-fibrous high consistency compositions can, besides coating colours, also be polymers or materials as could be seen as smell-taste driven, i.e. increasing or decreasing smell or taste properties in a product covered or packaged within this paper or paperboard, or materials adding a specific authenticity to the produced product in order to be able to trace the product and make sure that it is genuine.

The furnish comprising fibres and the non-fibrous high consistency composition are separately caused to flow through the headbox onto a wire to form a multiply web. The formation of the web, i.e. the distribution of the fibres are controlled and regulated and the web is dewatered to a consistency of above 1.5% by weight, preferable above 1.6% by weight but consistencies as high as 10% by weight may be possible. However, the normal consistency is 1.6% by weight which is typically when the web contains fibres (60%) of 1% consistency and filler (40%) at 20% consistency. The web is thereafter further dewatered in a press section, and the web receives a dry content of about 50-60% by weight before entering the drying section. Conventionally used dilution techniques may be used to better control the cross direction profiles in any, or all, of the layers to be formed.

The increased dry content at an early stage means that the drying section can be shortened and/or the temperature of the drying rolls can be decreased and/or the production capacity, i.e. machine speed, can be increased. The dry content of the finished paper or paperboard product is about 85-99%.

The fibre web may be dried using conventional drying techniques. The web is often dried, by heating cylinders which the fibre web is in contact with. Normally, steam heated drying cylinders are used in order to dry the wet web but gas or electrical fired, infrared or induction heating can also be used.

Furthermore, the web may also be dried using new drying technology, such as impingement drying, impulse drying, or other drying techniques performed with very hot surfaces. On-line calendering would also diminish calendering needs off-line since a smooth surface may already be achieved after drying.

The produced paper or paperboard product comprises at least two layers, one layer comprising fibres and one layer comprising a non-fibrous high consistency composition. The product can also comprise three, four, five, six or even more layers. The product may consist of more than one fibre layer with the same or different composition and one non-fibrous high consistency layer. The product may also consist of more than one non-fibrous high consistency layers with the same or different compositions and one fibre layer. The product may also consist of more than one fibre layers and more than one non-fibrous high consistency layers with the same or different compositions. The non-fibrous high consistency layers may either be located on each other or the non-fibrous high consistency layer can be located in between fibre layers. In the same way, the fibre layers can either be located on each other or they can be in between non-fibrous high consistency layers.

If necessary, at least one additional coating layer can be added to the surface of the produced paper or paperboard product prior to or after the drying section. This coating layer can be added by any conventional known technique in order to further improve the surface properties and above all the printing properties of the produced paper or paperboard product.

One very big advantage with the current invention is that no major changes in the equipment are needed. The paper or paperboard machine can be used with only some modifications of the headbox. The paper or paperboard machine must of course be runned in a different way due to the decreased demand of drying and due to the changed properties of the produced paper or paperboard product.

One example of a headbox (1) according to the invention can be seen in FIG. 1. Furnish is conducted to the headbox (1) through two conduits (2, 4) which further conducts the furnish to two inlet channels (5, 7). These inlet channels (5, 7) are the outer inlet channels of the headbox (1). The furnish is thereafter conducted to two turbulence generators (8, 9) and thereafter to a sliced cone (10). A coating colour is conducted to the headbox (1) through a conduit (3) and further to an inlet channel (6) located it the middle of headbox (1). The coating colour is thereafter directly conducted to the sliced cone (10).

The headbox can be of any kind of headbox for the production of multilayer products. Other embodiments and variation than the ones described above are possible within the scope of the invention as defined in the independent claims. For example, more than one headbox can be used.

When providing a second headbox with a furnish comprising fibers forming at least one additional layer and providing the second headbox with a non-fibrous high consistency composition forming at least one additional layer, a paper or paperboard product with at least two fibre layers and at least two non-fibrous high consistency composition layers is formed.

Even though the invention is directed towards production of paper or paperboard it should be mentioned that it could be possible to produce other products such as gypsum boards or MDF's (medium density fibreboard) or similar building materials with new constructions and properties (e.g. water proof, gas proof or fire proof boards), or various bases for composites to polymer industry pressing moulds, e.g. replace common polymers originating from the petrochemical industries, such as polyvinylchloride (PVC) and LDPE/HDPE (low/high density polyethylene) used as raw materials in mould forming products today.

The invention claimed is:

1. A process for producing a multilayer paper or paperboard product, which process comprises:
   providing a first headbox with a furnish comprising fibres, which furnish forms at least one layer of the paper or paperboard product,
   providing the first headbox with a non-fibrous high consistency composition with a dry solids content of 5-70% by weight, which composition forms at least one additional layer of the paper or paperboard product, conducting the furnish through a turbulence generator in the first headbox while conducting the non-fibrous high consistency composition through a conduit in the first headbox bypassing the turbulence generator, and conducting the layers onto at least one wire forming a multilayer web which is further dewatered and dried to form the paper or paperboard product.

2. The process according to claim 1 wherein the content of the non-fibrous high consistency composition is 10-80% by weight of the total content of the paper or paperboard product.

3. The process according to claim 1 wherein the non-fibrous high consistency composition is a coating colour.

4. The process according to claim 1 wherein the multilayer web has a dry content above 1.5% by weight before dewatering.

5. The process according to claim 1 wherein the paper or paperboard product consists of at least three layers.

6. The process according to claim 5 wherein the non-fibrous high consistency layer forms a middle layer of the paper or paperboard product.

7. The process according to claim 6 wherein the middle layer is in between at least two fibre layers.

8. The process according to claim 1 wherein the process further comprises providing a second headbox with a furnish comprising fibres, which furnish forms at least one additional layer of the paper or paperboard product, providing the second headbox with a non-fibrous high consistency composition, which composition forms at least one addition layer of the paper or paperboard product and conducting the additional fibre and non-fibrous layers onto one of the at least one wire forming a multilayer web which is further dewatered and dried to form the paper or paperboard product.

9. The process according to claim 1 wherein the non-fibrous high consistency composition has the dry solids content of 10-40% by weight.

10. The process according to claim 1 wherein the non-fibrous high consistency composition has the dry solids content of 25-40% by weight.

11. The process according to claim 1 wherein the non-fibrous high consistency composition comprises more than 90% by weight non-fibrous material.

12. The process according to claim 1 wherein the content of the non-fibrous high consistency composition is 30-60% by weight of the total content of the paper or paperboard product.

\* \* \* \* \*

UNITED STATES PATENT AND TRADEMARK OFFICE
CERTIFICATE OF CORRECTION

Page 1 of 1

PATENT NO. : 8,512,517 B2
APPLICATION NO. : 13/144025
DATED : August 20, 2013
INVENTOR(S) : Nordstrom It is certified that error appears in the above-identified patent and that said Letters Patent is hereby corrected as shown below:

In the Claims:

In Column 7, Line 4 of the issued patent, please insert --,-- after "headbox."

In Column 8, Line 6 of the issued patent, please delete "addition" and replace with --additional--

Signed and Sealed this
Thirtieth Day of December, 2014

Michelle K. Lee
*Deputy Director of the United States Patent and Trademark Office*